United States Patent [19]

Pelloux-Gervais

[11] 3,845,974
[45] Nov. 5, 1974

[54] COUPLING DEVICE FOR A TRANSFER CONDUIT FOR A CRYOGENIC LIQUID

[75] Inventor: Pierre Pelloux-Gervais, Grenoble, France

[73] Assignee: L'Air Liquids, Societe Anonyme Pour l'Etude et l'Exploitation des Procedes Georges Claude, Paris, France

[22] Filed: Jan. 18, 1973

[21] Appl. No.: 324,865

[30] Foreign Application Priority Data
Jan. 27, 1972   France .................................. 72.2696

[52] U.S. Cl. ................................................. 285/47
[51] Int. Cl. .......................................... F16l 11/12
[58] Field of Search .......... 285/352, 359, 360, 362, 285/377, 47; 174/19–20, 64–65 R, 21 R, 21 JR, 21 JC, 22 R, 22 C, 74 R, 74 A, 75 R, 84 R, 84 S

[56] References Cited
UNITED STATES PATENTS

| | | | |
|---|---|---|---|
| 2,132,506 | 10/1938 | Allen | 285/352 X |
| 3,517,951 | 6/1970 | Dunmire | 285/362 X |
| 3,638,971 | 2/1972 | Smith | 285/352 X |
| 3,645,562 | 2/1972 | Fandetti | 285/360 X |
| 3,712,583 | 1/1973 | Dale et al. | 285/47 X |

Primary Examiner—Geo. V. Larkin
Attorney, Agent, or Firm—Young & Thompson

[57] ABSTRACT

A coupling device, especially for a line conduit conveying cryogenic liquids, of the easy make-and-break type, essentially comprises two connectable coupling bodies, one body comprising at least one locking means actuated by rotation so as to engage with anchorage means rigidly fixed on the other said body, heat insulation means incorporated in each said body and acting in the radial direction, said insulating means comprising an annular block of insulating material with internal and external walls enclosed by a casing on which are fixed said locking and/or said anchorage means, each annular block having a substantially flat radial wall and at least two coaxial fluid-tight joints being arranged so as to project towards the exterior beyond said radial wall, in the vicinity of the internal wall of said annular block in which is engaged an axial pipe connected to said line conduit which is also fixed on the internal wall of the annular block, and of the external wall of said annular block, the whole arrangement being such that in the assembled position, said joints are respectively applied one against the other by the effect of said locking means.

The annular block is preferably made of an expandable plastic material such as polyurethane.

6 Claims, 3 Drawing Figures

COUPLING DEVICE FOR A TRANSFER CONDUIT FOR A CRYOGENIC LIQUID

The present invention relates to a coupling for a transfer conduit for cryogenic liquid, comprising two connectable coupling bodies, one comprising at least one locking means, actuated by rotation, for clamping with an anchorage means rigidly fixed to the other body, each body incorporating means for thermal insulation in the radial direction. The invention is also concerned with a cryogenic liquid transfer line equipped with a coupling of this kind.

The transfer of cryogenic fluids presents numerous problems, since it is particularly essential to insulate the transfer lines completely so as to limit the evaporation of fluids caused by the ingress of heat.

At the present time, the extremities of transfer lines for cryogenic fluids are formed by heat barriers intended to increase the distance between the ambient medium and the passage conduit of the said fluid; these are, for example, junctions of the "Johnston" type or junctions of the insulated metallic coupling type.

Couplings have recently been proposed for the transfer of liquefied gas at high flow-rates, which are constituted by coupling cheeks mounted on transfer tubes and provided with locking means. While these couplings are very easy to assemble, their heat insulation is far from satisfactory and is even non-existant, which does not permit of their use with cryogenic liquids for transfers at relatively-low flow-rates, which are thus subject to large losses of heat. Condensation frost is frequently observed at the level of the couplings which does not facilitate their dismantling. When the problem of coupling together tubes of different diameters arises, the above-mentioned devices do not give satisfaction.

The invention relates to a coupling for cryogenic transfer which eliminates these disadvantages. It must be designed in such manner as to be strong, reliable, light and perfectly heat-insulated. It must furthermore have good flexibility both when cold and when hot, and its assembly and dismantling manually must be easy.

According to a characteristic feature of the invention, the heat-insulation means comprise an annular block of insulating material with internal and external walls enclosed by a casing on which are fixed the locking and/or anchorage means, each annular block having a substantially flat radial wall, at least two coaxial fluid-tight joints being arranged so as to project towards the exterior beyond the said radial wall, in the vicinity of the internal wall of the annular block in which is engaged an axial pipe coupled to the transfer conduit, itself gripped against the internal wall of the said annular block, and in the vicinity of the external wall of the annular block, the whole being such that in the assembled position, the joints are respectively applied against each other by the effect of the locking means.

The invention is also directed to a transfer line element, the characteristic feature of which is that the coupling body is mounted on the end of a transfer conduit constituted by an external sheath with an reaches the insulator, or when so desired by a sheath forming an anti-vapour barrier interposed either between the insulator and the outer sheath or between the outer sheath and the casing, the said conduit being extended by the axial pipe, the whole arrangement being such that the said pipe reachesthe level of the internal joint and the insulation of the transfer conduit comes into abutment against the annular block.

Other characteristic features and advantages of the invention will furthermore be brought out in the description which follows below by way of example, reference being made to the accompanying drawings, in which.

In view of the symmetry of the construction shown in FIG. 1, only a portion B of the coupling body is described, this having the same parts as the body A and these parts are represented by numbers which are primed for the body B and have no prime for the body A.

Figure 1:
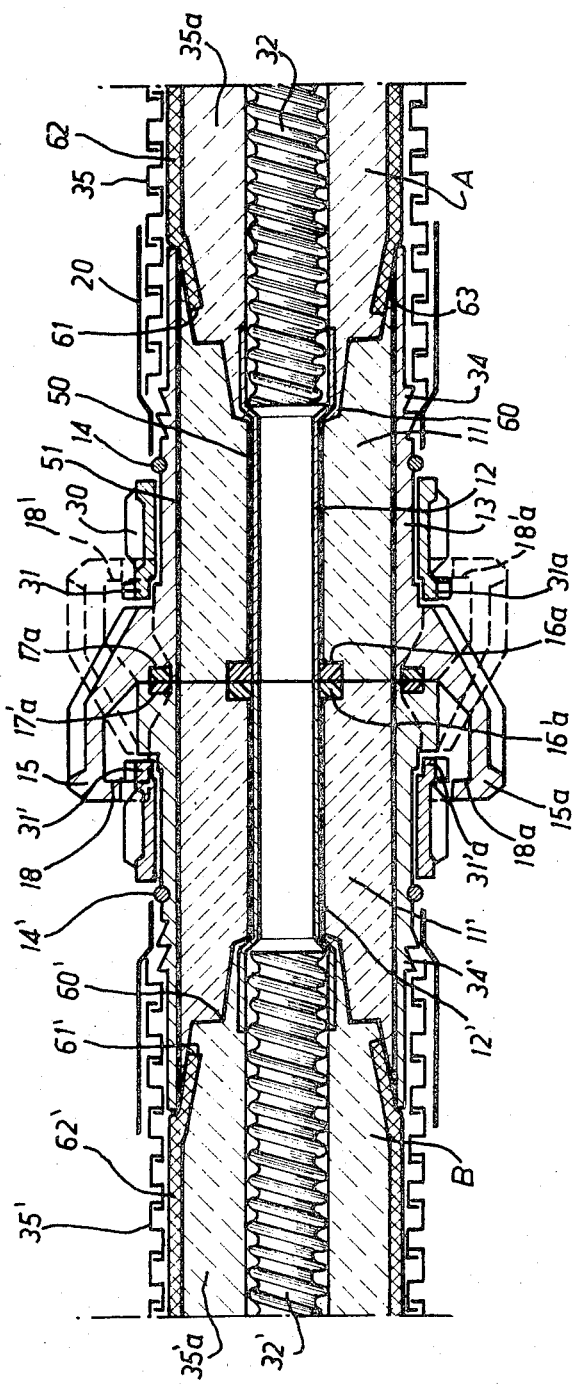
FIG. 1 shows a view in cross-section of a type of junction according to the invention.

The body A comprises a central pipe 12 of stainless steel for example, which is mounted by adhesive on the internal wall of an annular block 11 of insulating material, which may be of polyurethane or any other expandable material. This latter in turn has its outer wall secured to a coaxial casing 13 of light metal such as an aluminum alloy. The securement together of the elements 11, 12 and 13 is effected by coating the internal and external walls of the annular block 11 with a resin of the epoxide type (as shown at 50 and 51 in FIG. 1). It is clear that, depending on the type of the annular block 11, securement is not absolutely necessary.

At one of its extremities, the block 11 has a first so-called "de-moulding" cone 60 and a second so-called "coupling" cone 61, coaxial but having a larger base diameter, this latter facilitating the ultimate admission of a sheath 62 forming an anti-vapour barrier and thus producing semi-fluid tightness in the region 63 of the cone 61. It would be possible to consider the use of multi-layer insulating material (such as winding with terphane for example) instead of glass wool and in this case the anti-vapour barrier is not absolutely necessary. A flexible tube 32, of stainless metal for example, penetrates deeply into the cone 60 and is located in the axial extension of the pipe 12.

Around the flexible tube 32 is located a heat-insulating body 35a, of glass wool for example, covered by the anti-vapour sheath 62 secured in the cone 61. The assembly formed by the elements 32, 35a and 62 is surrounded by a flexible metal sheath 35 coaxial and fixed to the casing 13 at the level of the saw-teeth 34. In order to facilitate handling of the coupling body A, the sheath 35 is covered at the level of the teeth 34 with a heat-retractable material which furthermore fixes together the sheath 35 and the casing 13. As shown in FIG. 1, the insulating body 35a of glass wool and the anti-vapour barrier 62 come into abutment against the annular block 11, thus producing semi-fluid tightness. Depending on the nature of the cryogenic liquid to be conveyed, the anti-vapour barrier may be interposed between the outer sheath and the casing in certain cases.

On the casing 13 is mounted a movable ring 30 forming a bolt with helicoidal ramps 31 and 31a, vertically above each other. The maintenance of the bolt 30 in position is effected by a collar 19 on one side and by a circlip 14 on the other.

The annular block 11 has a radial wall 33 substantially flat on the side opposite to the flexible tube 32, and this wall is provided with a so-called "cold" coaxial fluid-tight joint 16a, placed in a groove 16 opening on to the pipe 12 which is secured to the internal wall of the block 11. At the level of the external wall of the annular block 11, secured to the casing 13 and on the radial wall, is provided a so-called "hot" joint 17a, also coaxial and placed in a groove 17 formed in the body of the casing 13.

This groove 17 may equally well be formed in the annular block 11. The two joints 16a and 17a project towards the exterior of the radial wall of the block 11. The so-called "hot" and "cold" joints may be replaced by an extra metallic thickness which may or may not form part of the casing 13 and of the central tube 12 on one of these two coupling bodies; this is the case for example of a coupling with one division.

The casing 13 forming an end piece is provided on the side opposite to the flexible tube 32 with two half-shells 15 and 15a extending largely beyond the radial wall 33, each half-shell having respectively a groove 18 and 18a, permitting each of the bolts 31' and 31'a of the corresponding body B to be engaged.

Figure 2:
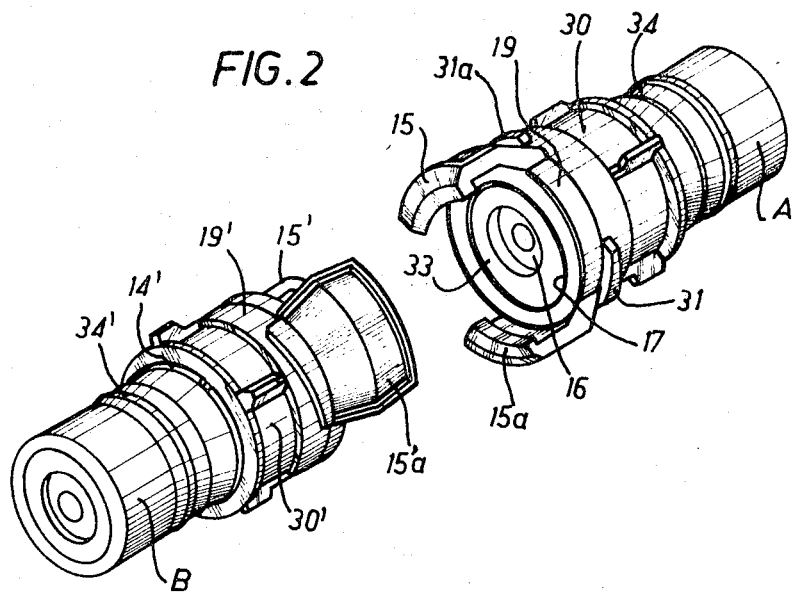
FIG. 2 shows a perspective view of the position of the parts before engagement.

In accordance with FIG. 2, the coupling bodies A and B may be coupled together by imbrication, the half-shells 15 and 15a of the body A on the one hand and 15' and 15'a of the body B on the other hand being located at 90° from each other.

By rotation of the moving rings 30 and 30', the locking of the bodies A and B is effected, the helicoidal ramps 31 and 31a, 31' and 31'a being engaged in the grooves of the half-shells respectively 18, 18a, 18' and 18'a.

The joints 16a and 16'a are located respectively facing the joints 17a and 17'a during the locking operation, and by compression ensure the fluid-tightness of the coupling which permits the circulation of cryogenic fluid through the flexible tubes 32 and 32'.

It is furthermore quite possible to envisage a coupling for rigid lines, using only a single central tube, of stainless steel for example, and also constituting the rigid transfer conduit. The tube is insulated by a cellular or multi-layer material, such as flexible polyurethane, which is placed between the tube and an external sheath, the coupling cone of the annular block permitting the cellular or multi-layer material to be secured on the block.

It is clear that various devices may be considered. For example, instead of having a rigid linear transfer conduit consituted by a single tube, there may be envisaged conduits elbowed at 90° with insulation of moulded plastic material, without departing from the scope of the invention.

Similarly, "reductions" for the passage from an element of large diameter to an element of smaller diameter can be employed. "Divisions" such as those having the form of a T with an inlet and two outlets may be utilized; these permit the supply of two stations to be fed from a single storage tank. The insulation is carried out with polyurethane or any other type of cellular foam.

The production of flexible types which are not subject to angular deformation by torsion necessitates the modification of the junctions placed on fixed equipment such as storage tanks, lines, traps.

Figure 3:
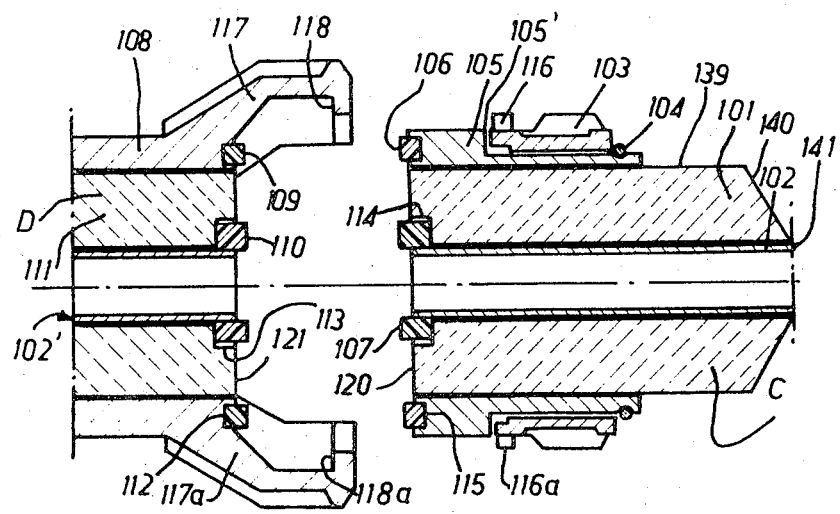
FIG. 3 is a view in cross-section of an alternative form of construction according to the invention.

FIG. 3 shows a device of this kind. A coupling body C is constituted by a central tube 102 connected to a coupling (not shown) placed on a tank which is also not shown. This coupling may be straight or square. The tube 102 is secured by adhesive to the internal wall of an annular block 101 of insulating material, which supports coaxially a casing 105 also secured to the outer wall of the block 101. A mobile ring or bolt 103 with ribs 116 and 116a is held in position on the casing 105 by a circlip 104 on the tank side and by an abutment 105' on the other side, and is freely mounted on the casing 105.

The block 101 has a flat radial wall 120 and the extremity on the abutment side of the casing 105 has its face coinciding with the wall 120. A joint 106 is formed in a groove 115 in the casing 104 vertically above the wall 120. Similarly, around the pipe 102 and facing the joint 106 is located a second joint 107 placed in a groove 114 formed in the block 101. On the annular block 101 and on the tank side is mounted a ring 139 of small thickness of stainless steel, which is secured on the block 101 and on the ring 105. The part 139 has a conical face 140 welded at 141 to the central tube 102.

A body D having the same characteristics as the bodies A and B of FIGS. 1 and 2, serves as a complementary locking device for the body C. This body D essentially comprises a central tube 102' of the same diameter as the tube 102, an annular block 111 with a flat radial wall 121 and two joints 109 and 110 placed respectively in grooves 112 and 113. A casing 108 comprises two half-shells 117 and 117a with two groove bottoms 118 and 118a. The casing 108 is generally provided with a bolt (not shown).

The engagement of the elements C and D is effected by locking as is the preceding embodiment, the ribs 116 and 116a of C being engaged in the grooves 118 and 118a of D.

Thus, the coupling body of the type C may be connected to elbows having a number of extremities or to T-joints in order to eliminate the angular orientation due to the half-shells.

The advantage of the various arrangements according to the invention resides inter alia in a moderately low production cost, an easy assembly not necessarily requiring the use of a key.

What I claim is:

1. A coupling device for a transfer conduit conveying cryogenic liquids, said device comprising two connectable coupling bodies, one said body comprising at least one locking means actuated by rotation so as to engage with anchorage means rigidly fixed on the other said body, heat insulation means incorporated in each said body and acting in the radial direction, said insulation means comprising an annular block of insulating material with internal and external walls enclosed by a casing on which are fixed said locking and anchorage means, each annular block having a substantially flat radial wall, at least two coaxial fluid-tight joints projecting towards the exterior beyond said radial wall, in the vicinity of the internal wall of said annular block in which is engaged an axial pipe connected to said transfer conduit which is also fixed on the internal wall of said annular block and also in the vicinity of the external wall of said annular block, whereby in the assembled position said joints are respectively applied one against the other by the effect of said locking means.

2. Conduit means for the conveyance of cryogenic liquid provided with a coupling as claimed in claim 1, in which said body is mounted on the extremity of a transfer conduit constituted by an external sheath with an intermediate insulating member forming an anti-vapour barrier interposed either between said insulating member and the outer sheath or between said outer sheath and said casing, said conduit being extended by said axial pipe, said pipe reaching the level of the internal joint and the transfer conduit insulation coming into abutment against said annular block.

3. Conduit means as claimed in claim 2, in which one extremity of said sheath is rigidly fixed to the casing of said coupling by means of a heat-retractable sheath.

4. Conduit means as claimed in claim 2, in which said sheath forming an anti-vapour barrier placed between said external sheath and said insulating member is incorporated in a substantially conical wall of said annular insulating block.

5. Conduit means for the transfer of cryogenic liquid as claimed in claim 1, in which said annular block is made from an insulating expandable material such as polyurethane.

6. Conduit means for the transfer of cryogenic liquid as claimed in claim 1, in which said central pipe and said casing are secured by adhesive means to said annular block.

* * * * *